United States Patent Office 3,489,773
Patented Jan. 13, 1970

3,489,773
ANTHRAQUINONE DYESTUFFS
Rütger Neeff, Leverkusen, Karl-Friedrich Zenner, Cologne-Flittard, Wilhelm Gohrbandt, Leverkusen, and Robert Kuth, Cologne-Muengersdorf, Germany, assignors to Farbenfabriken Bayer Aktiengesellschaft, Leverkusen, Germany, a corporation of Germany
No Drawing. Filed May 9, 1966, Ser. No. 548,411
Claims priority, application Germany, May 20, 1965, F 46,098
Int. Cl. C07d 63/04; C09b 1/56
U.S. Cl. 260—329.2
7 Claims

ABSTRACT OF THE DISCLOSURE

Anthraquinone dyestuffs of the general formula:

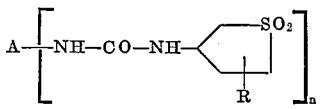

wherein A is an anthraquinone radical, R is hydrogen or methyl, and $n$ is 1 or 2. These dyestuffs are particularly valuable in dyeing and printing synthetic fiber material, especially aromatic polyesters or cellulose esters.

---

The present invention relates to anthraquinone dyestuffs of the general formula:

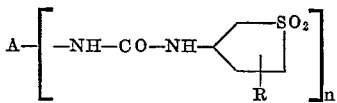

wherein A denotes an anthraquinone radical which preferably contains up to 4 condensed rings, R denotes hydrogen or a methyl group and $n$ is 1 or 2.

It has been found that valuable dyeings and prints are obtained on synthetic fibre material, especially of aromatic polyesters or cellulose esters, by using as dyestuffs compounds of the general formula given above or mixtures thereof.

The anthraquinone derivatives employed according to the invention may also contain one or several other substituents, e.g. halogen atoms, such as fluorine, chlorine or bromine, hydroxy groups, alkoxy groups, amino groups, acylamino groups, alkylamino groups with 1 to 3 carbon atoms, arylamino groups in which the aryl radical is preferably a phenyl group, which may be substituted by one or several halogen atoms, alkyl or alkoxy groups, alkyl or optionally substituted phenyl-sulphonyl groups, alkyl or optionally substituted phenyl thioether radicals as well as cyano, carboxylic acid ester and acetyl groups. Examples of tetracyclic anthraquinone radicals are 1,9-isothiazoleanthrone, 1,9-anthrapyrimidine or 1,9-pyrazole-anthrone. The alkyl radicals are preferably lower alkyl radicals which may contain up to 6 carbon atoms. It is of course also possible to use dyestuff mixtures, instead of individual dyestuffs.

The following compounds are examples of the anthraquinone derivatives used according to the invention:

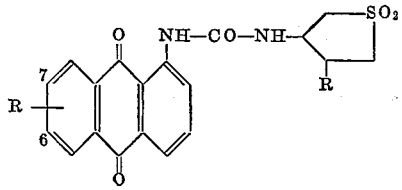
R=H, CH₃
R'=H, 6-Cl, 7-Cl, 6-F, 7-F

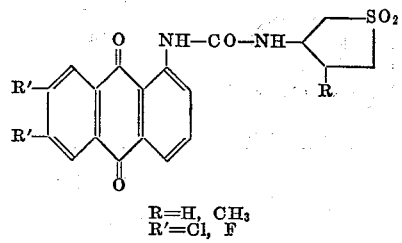
R=H, CH₃
R'=Cl, F

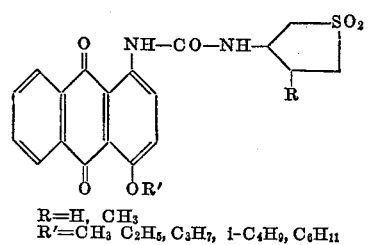
R=H, CH₃
R'=CH₃ C₂H₅, C₃H₇, i-C₄H₉, C₆H₁₁

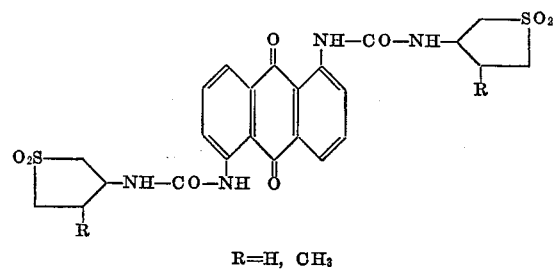
R=H, CH₃

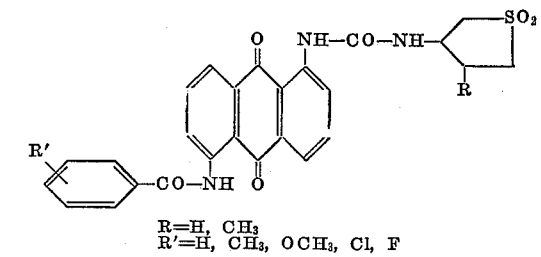
R=H, CH₃
R'=H, CH₃, OCH₃, Cl, F

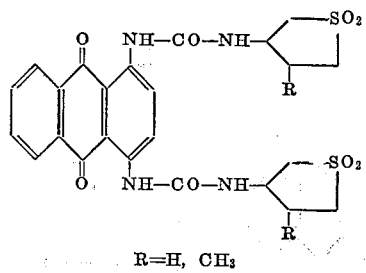
R=H, CH₃

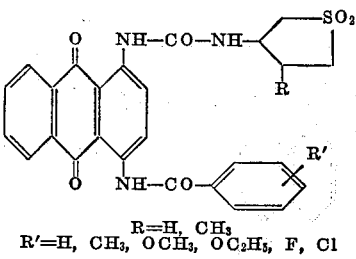
R=H, CH₃
R'=H, CH₃, OCH₃, OC₂H₅, F, Cl

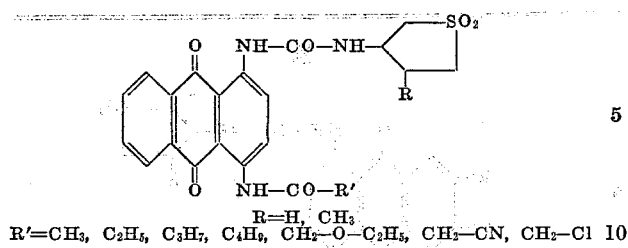

R'=CH₃, C₂H₅, C₃H₇, C₄H₉, CH₂—O—C₂H₅, CH₂—CN, CH₂—Cl

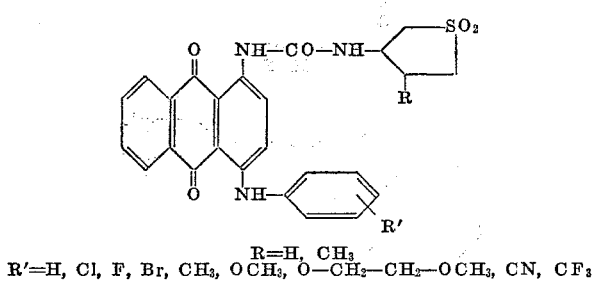

R'=H, Cl, F, Br, CH₃, OCH₃, O—CH₂—CH₂—OCH₃, CN, CF₃

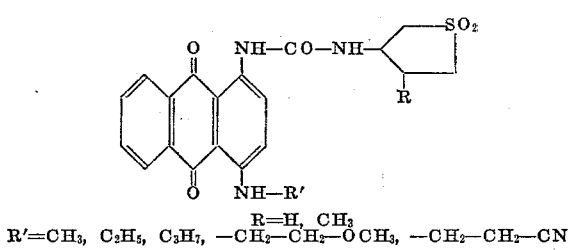

R'=CH₃, C₂H₅, C₃H₇, —CH₂—CH₂—OCH₃, —CH₂—CH₂—CN

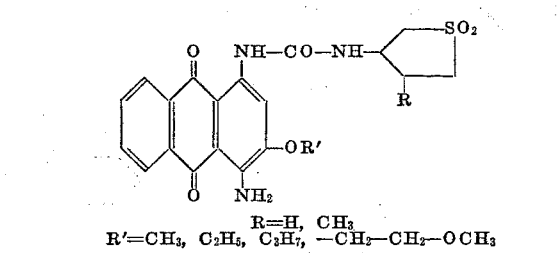

R'=CH₃, C₂H₅, C₃H₇, —CH₂—CH₂—OCH₃

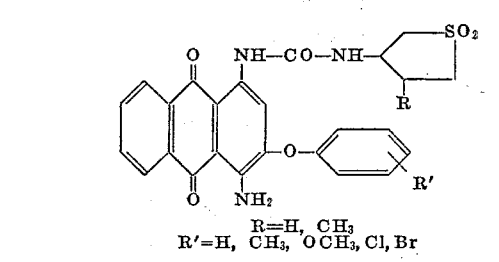

R'=H, CH₃, OCH₃, Cl, Br

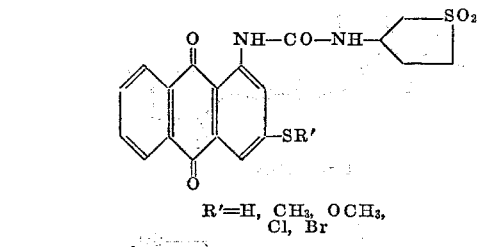

R'=H, CH₃, OCH₃, Cl, Br

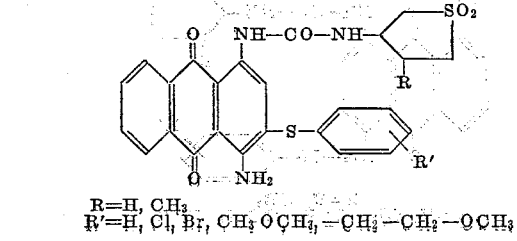

R'=H, Cl, Br, CH₃ OCH₃, —CH₂—CH₂—OCH₃

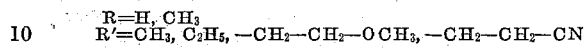

R=H, CH₃
R'=CH₃, C₂H₅, —CH₂—CH₂—OCH₃, —CH₂—CH₂—CN

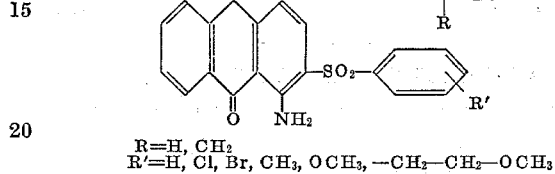

R=H, CH₃
R'=H, Cl, Br, CH₃, OCH₃, —CH₂—CH₂—OCH₃

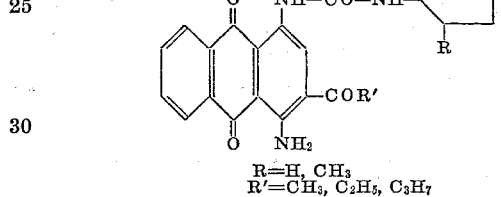

R=H, CH₃
R'=CH₃, C₂H₅, C₃H₇

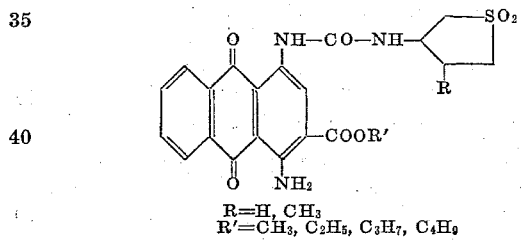

R=H, CH₃
R'=CH₃, C₂H₅, C₃H₇, C₄H₉

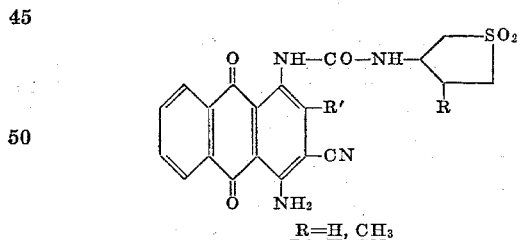

R=H, CH₃
R'=H, CN

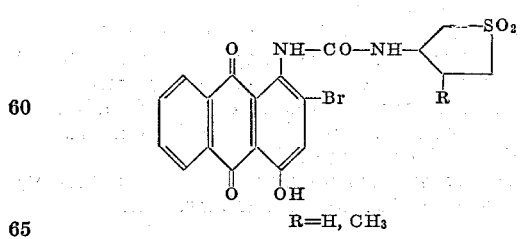

R=H, CH₃

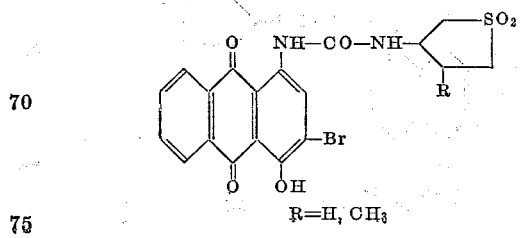

R=H, CH₃

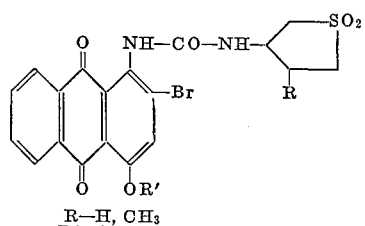
R=H, CH₃
R′=CH₃, C₂H₅, i-C₃H₇, C₄H₉
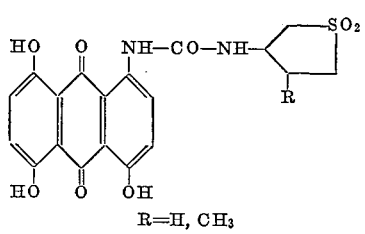
R=H, CH₃
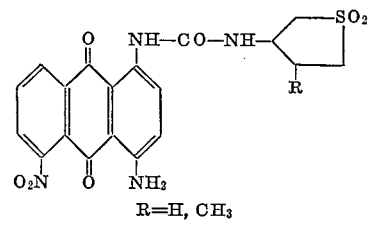
R=H, CH₃
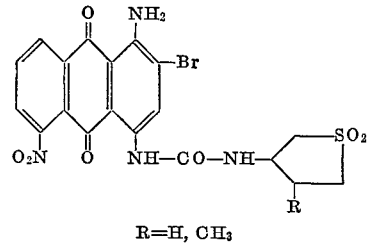
R=H, CH₃
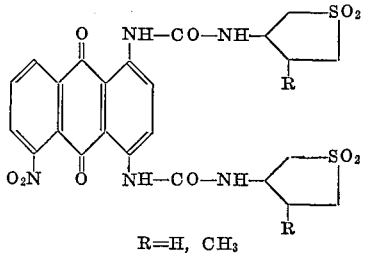
R=H, CH₃
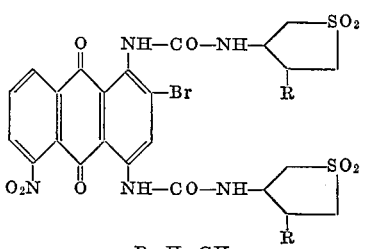
R=H, CH₃
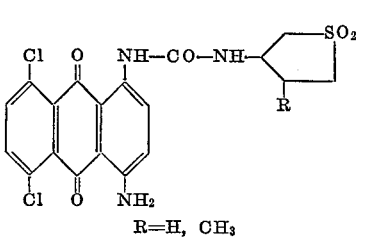
R=H, CH₃
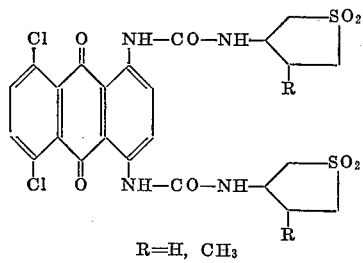
R=H, CH₃
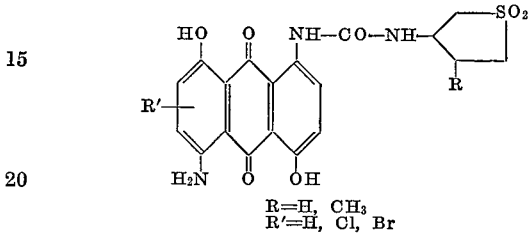
R=H, CH₃
R′=H, Cl, Br
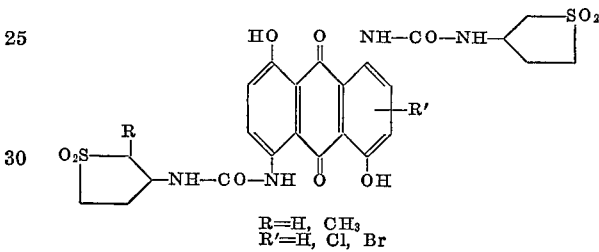
R=H, CH₃
R′=H, Cl, Br
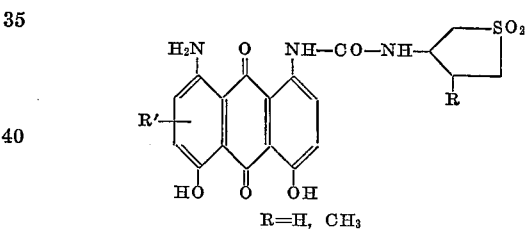
R=H, CH₃
R′=H, Cl, Br
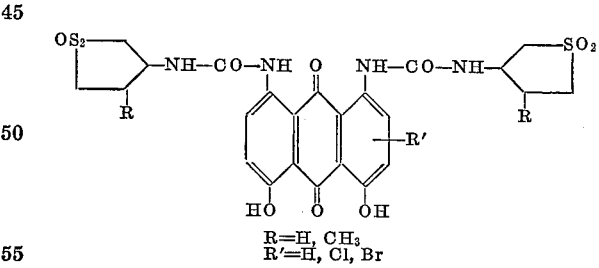
R=H, CH₃
R′=H, Cl, Br
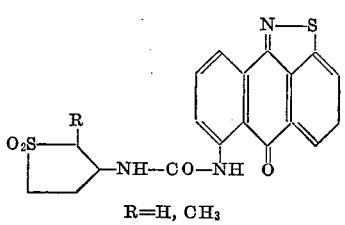
R=H, CH₃
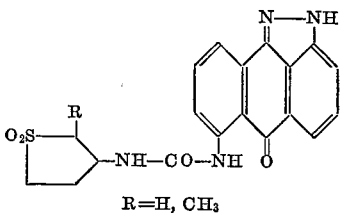
R=H, CH₃

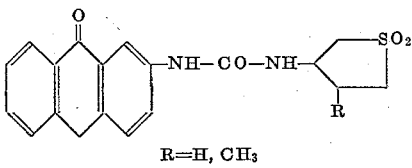

R=H, CH₃

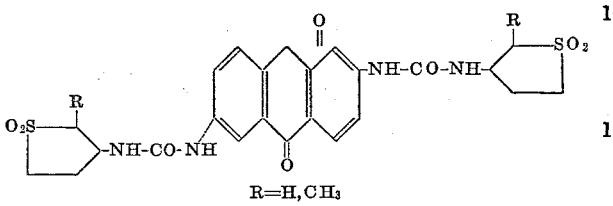

R=H, CH₃

The dyestuffs according to the present invention may be applied to the following examples of synthetic fibres: fibres of polyamides, polyurethanes, polyacrylonitrile or, preferably, polyesters such as cellulose triacetate, polyethylene terephthalate or esters of 1,4-bis-hydroxymethyl-cyclohexane and terephthalic acid.

An aqueous dispersion can be used for the dyeing or printing of the polyester materials, e.g. a padding solution or printing paste of the dyestuffs or mixtures thereof, in the presence of carriers at 95–110° C., or in the absence of carriers at 120–145° C.

Dyeing or printing is preferably carried out according to the theromsol process, in which the printed or dyed polyester materials are briefly heated, possibly after intermediate drying, at temperatures within a range of about 180–220° C. The heating is generally carried out for period of 30 seconds to 2 minutes.

The compounds used according to the present invention can be obtained, for example, by reacting appropriately substituted amino-anthraquinones with optionally methyl-substituted tetramethylene-sulphone-3-isocyanates in organic solvents, such as o-dichlorobenzene or nitrobenzene, at 50–220° C., optionally in the presence of catalysts such as triethylamine.

The compounds used according to the invention can also be produced, for example, as follows: Carbamic acid chlorides, which may be obtained from the reaction of appropriately substituted amino-anthraquinones with phosgene, are reacted with optionally methyl-substituted 3-amino-tetramethylene-sulphones. Alternatively, N-3-tetramethylene-sulphone-carbamic acid chlorides are reacted with appropriately substituted amino-anthraquinones in organic solvents, such as o-dichlorobenzene or nitrobenzene, in the presence of acid-binding agents, at 20–200° C.

The compounds used according to the invention can also be obtained by condensing in organic solvents at 20–200° C. urethanes which can be obtained from the reaction of appropriately substituted amino-anthraquinones with chlorocarbonic acid esters, such as, for example, the phenyl urethanes, with possibly methyl-substituted 3-amino tetra-methylene-sulphones or, alternatively, N-3-tetramethylene-sulphone-urethanes, e.g. phenyl urethane, with appropriately substituted amino-anthraquinones.

The dyeings and prints obtained according to the present invention are characterised by a very good texture, high dyestuff yield and clear shades, and possess outstanding fastness to light, washing, thermofixing and ironing.

In the following examples, which are given for the purpose of illustrating the invention without limiting the same, the parts are parts by weight unless otherwise stated, and the temperatures are given in degrees centigrade.

Example 1

(a) A fabric of polyethylene terephthalate fibres is impregnated on the foulard with a liquor containing 20 gm. per litre of the dyestuff of the formula:

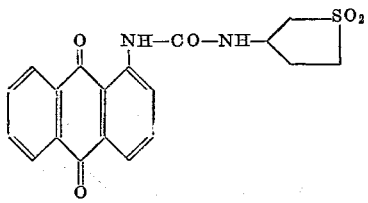

and 10 g. of a thermosol auxiliary agent, preferably a polyether as described, for example, in Belgian patent specification No. 615,102. The fabric is then squeezed to a weight increase of 70% and dried in a suspension nozzle drier or drying cabinet at 80–120°. The fabric is subsequently treated wtih hot air in a tenter-frame or nozzle hot flue at 190–210° for about 45 seconds, then rinsed, optionally subjected to a reductive after-treatment, washed, rinsed and dried. The reductive after-treatment to remove dyestuff particles superficially adhering to the fibres can be carried out as follows. The fabric is introduced at 25° into a dyebath containing 3–5 cc. per litre of a sodium hydroxide solution of 38° Bé. and 1–2 g. per litre concentrated hydrosulphite, heated to 70° within about 15 minutes and kept at 70° for a further 10 minutes. The material is subsequently rinsed while hot, acidified at 50° with 2–3 cc./litre 85% formic acid, rinsed and dried. A clear yellow dyeing is obtained which is characterised by its high dyestuff yield and very good texture as well as by outstanding fastness to light, thermofixing, washing and ironing. A clear yellow dyeing is obtained in a similar manner when, instead of polyethylene terephthalate fibres, there are used polyester fibres obtained from 1,4-bis-hydroxy-methyl-cyclohexane and terephthalic acid, or cellulose triacetate or polyamide fibres.

(b) A previously cleaned and thermofixed fabric of polyethylene terephthalate fibres is printed with a printing paste which consists of the following components: 40 g. of the dyestuff mentioned in Example 1(a), 475 g. water, 465 g. crystal gum (1:2) and 20 g. sulphated castor oil. Instead of crystal gum, an alginate thickening may also be used. To fix the dyestuff the printed and dried material is led at 190–210° over a high capacity tenter frame or through a condensing apparatus. The treatment lasts about 30–60 seconds. The resulting fixed print is subsequently rinsed cold, soaped with 1–2 g./litre of an anion-active detergent at 70–80° for about 10 minutes, rinsed first hot and then cold and dried. A print similar to the dyeing of Example 1(a) is obtained, which is characterised by the same outstanding fastness properties. A clear yellow print is obtained in a similar manner if, instead of polyethylene terephthalate fibres, polyester fibres of 1,4-bis-hydroxy-methyl-cyclohexane and terephthalic acid, or cellulose triacetate or polyamide fibres are used.

(c) 10 parts polyethylene terephthalate fibres are dyed at 125–130° for 2 hours in a dyebath adjusted to pH 4.5 and consisting of 400 parts water and 0.1 parts of the finely dispersed dyestuff mentioned in Example 1(a); they are then rinsed and dried. A clear yellow dyeing is obtained which is characterised by outstanding fastness properties.

(d) 10 parts polyethylene terephthalate fibres are dyed at 100° for 1.5 hours in a dyebath adjusted to pH 4.5 and consisting of 400 parts water, 0.1 part of the finely dispersed dyestuff mentioned in Example 1(a) and 1.5 parts o-cresotic acid methyl ester. A clear yellow dyeing which is characterised by very good fastness properties is obtained.

(e) The dyestuff used in Example 1(a) can be prepared in the following manner, for example: 40 parts 1-amino-anthraquinone are mixed at 150° for 2 hours in 400 parts o-dichlorobenzene and 0.1 part triethylamine with 32 parts tetramethylene sulphone-3-isocyanate and stirred at 150° for a further 4 hours. After cooling, the dyestuff, which crystallises in the form of yellow needles, is filtered off under suction, washed with methanol. 66.2 parts (96% of the theoretical) of the dyestuff are obtained the formula of which is given in Example 1(a).

$C_{19}H_{16}N_2O_5S$ (384.3): calculated, S 8.34; found, S 8.23.

(f) The dyestuff used in Example 1(a) can also be produced in the following way: 40 parts 1-amino-anthraquinone are slowly mixed at 30–80° in 400 parts o-dichlorobenzene and 40 parts pyridine with 37 parts N-3-tetramethylene-sulphone-carbamic acid chloride and then heated at 100–150° until the dyestuff formation is completed. After cooling, the product, which crystallises in the form of yellow needles, is filterd off under suction, and washed with methanol. After drying the same dyestuff as used in Example 1(a) is obtained in a very good yield.

(g) The dyestuff used in Example 1(a) can also be produced in the following manner: 40 parts 1-amino-anthraquinone and 50 parts N-3-tetramethylene-sulphone-phenyl urethane are heated in 400 parts o-dichlorobenzene at 100–180° until the dyestuff formation is completed. After cooling, the product, which crystallises in the form of yellow needles, is filtered off under suction, and washed with methanol; after drying, the same dyestuff as used in Example 1(a) is also obtained in a very good yield.

Example 2

(a) A fabric of polyethylene terephthalate fibres is dyed according to Example 1(a) with a liquor which contains 20 g. per litre of the dyestuff of the formula:

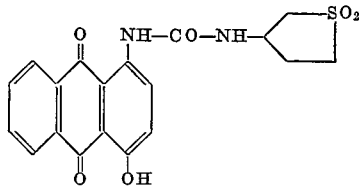

A brilliant yellowish red dyeing is obtained which is characterised by its high dyestuff yield, very good texture and outstanding fastness to light, thermofixing, washing and ironing. A similar dyeing is obtained when cellulose acetate fibres are used instead of polyethylene terephthalate fibres.

(b) The dyestuff can be obtained in th following manner, for example:

21.5 parts 4-amino-1-hydroxy-anthraquinone are stirred for 5 hours at 150° in 200 parts o-dichlorobenzene and 0.05 part triethylamine with 18 parts tetramethylene-sulphone-3-isocyanate and heated at boiling temperature for 5 minutes. After cooling, the product which crystallises in the form of bright red needles is filtered off under suction and washed with methanol; 34.3 parts, i.e. 95.3% of the theoretical, of the above dyestuff are obtained.

$C_{19}H_{16}N_2O_6S$ (400.3): calculated, S 8.00; found, S, 8.12.

Example 3

A fabric of polyethylene terephthalate fibres is dyed according to Example 1(a) with a liquor containing, per litre, 20 g. of the dyestuff of the formula:

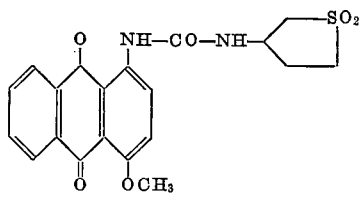

A clear orange dyeing is obtained which possesses, besides very good texture and high dyestuff yield, excellent fastness to light, thermofixing, washing and ironing. Analogous dyeings are obtained when cellulose triacetate fibres are used instead of polyethylene terephthalate fibres. The dyestuff used can be prepared, for example, by the reaction of 4-amino-1-methoxy-anthraquinone with tetramethylene-sulphone-3-isocyanate in o-dichlorobenzene at 150° according to Example 2(b).

Example 4

When a fabric of polyethylene terephthalate fibres is dyed according to Example 1(a) with a liquor containing, per litre, 20 g. of the dyestuff of the formula:

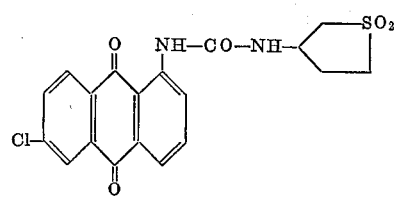

a clear yellow dyeing with excellent fastness properties is obtained. If, instead of this dyestuff, a dyestuff of the formula:

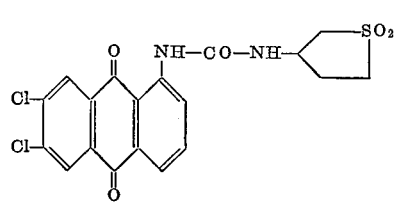

is used, a clear yellow dyeing with excellent fastness properties is also obtained. The dyestuffs can be produced by the reaction of 1-amino-6-chloro- or 1-amino-6,7-dichloro-anthraquinone with tetramethylene-sulphone-3-isocyanate at 150°, as described in Example 2(b).

Example 5

A fabric of polyethylene terephthalate fibres is dyed according to Example 1(a) with a liquor which contains, per litre, 20 g. of the dyestuff of the formula:

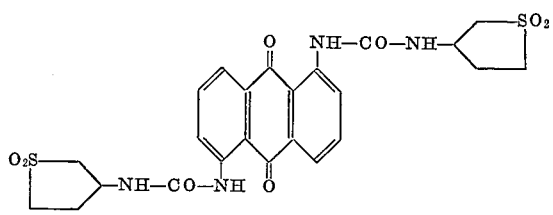

A clear yellow dyeing is obtained which exhibits outstanding fastness properties. A yellow dyeing is also obtained, if, instead of the above dyestuff, a dyestuff of the formula:

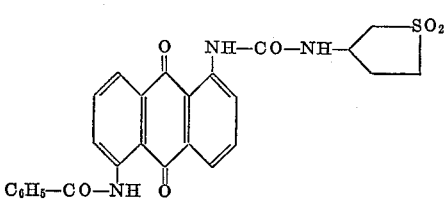

is used. Both dyestuffs can be produced by the reaction of 1,5- diamino - or 1 - amino - 5 - benzoylamino - anthraquinone with tetramethylene-sulphone-3-isocyanate in nitrobenzene at 150–170°, in the presence of triethylamine as catalyst.

Example 6

When a fabric of polyethylene terephthalate fibres is dyed according to Example 1(a) with a liquor containing, per litre, 20 g. of a dyestuff of the formula:

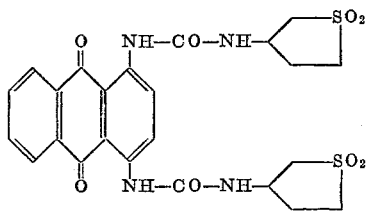

an intense bluish-red dyeing with excellent fastness properties is obtained. The dyestuff can be obtained by the reaction of 1,4-diamino-anthraquinone with tetramethylene-sulphone-3-isocyanate in nitrobenzene at 150–170°, in the presence of triethylamine as catalyst.

Example 7

When a fabric of polyethylene terephthalate fibres is dyed according to Example 1(a), a liquor containing, per litre, 20 g. of a dyestuff of the formula:

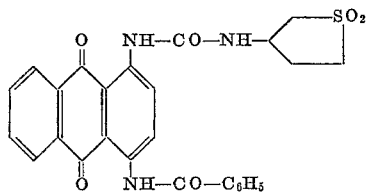

is used and a bluish-red dyeing showing excellent fastness properties is obtained. A bluish-red dyeing is also obtained if, instead of the above dyestuff, a dyestuff of the formula:

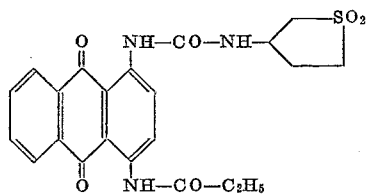

is used. Both dyestuffs can be prepared, for example, by the reaction of 1-amino-4-benzoylamino- or 1-amino-4-propionyl-amino-anthraquinone with tetramethylene-sulphone-3-isocyanate in o-dichlorobenzene at 150–160°, in the presence of triethylamine as catalyst.

Example 8

When a fabric of polyethylene terephthalate fibres is dyed according to Example 1(a) with a liquor which contains 20 g. per litre of a dyestuff of the formula:

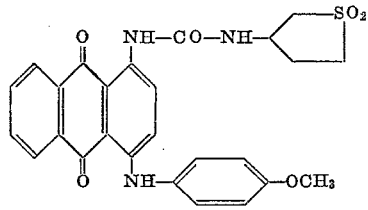

a full dark blue dyeing is obtained which exhibits excellent fastness properties. A similar dark blue dyeing with very good fastness properties is obtained if, instead of fabrics of polyethylene terephthalate fibres, fabrics of cellulose triacetate fibres are used. A deep blue dyeing is also obtained if, instead of the above-mentioned dyestuff, a dyestuff of the formula:

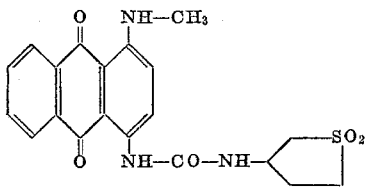

is employed.

Example 9

When a fabric of polyethylene terephthalate fibres is dyed according to Example 1(a) with a liquor which contains, per litre, 20 g. of a dyestuff of the formula:

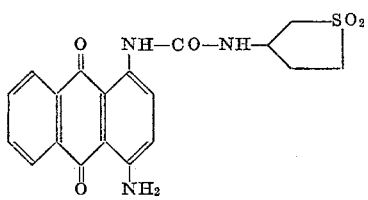

a brilliant bluish-red dyeing is obtained which possesses, besides very good texture and high dyestuff yield, excellent fastness to light, thermofixing, washing and ironing. A similar dyeing is obtained when cellulose triacetate fibres are used instead of polyethylene terephthalate fibres. The dyestuff can be produced, for example, by reacting 1,4-diamino-2-methoxy-anthraquinone with tetramethylene-sulphone-3-isocyanate in o-dichlorobenzene at 150°, in the presence of triethylamine as catalyst.

Brilliant bluish-red dyeings are also obtained when fabrics of polyethylene terephthalate or cellulose triacetate fibres are dyed according to Example 1(a) or printed according to Example 1(b) with the following dyestuffs:

| Example | Dyestuff |
|---|---|
| 10 | 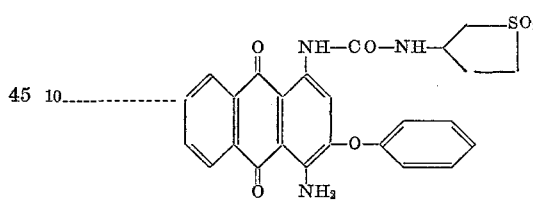 |
| 11 | 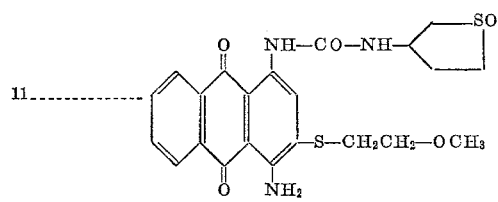 |
| 12 | 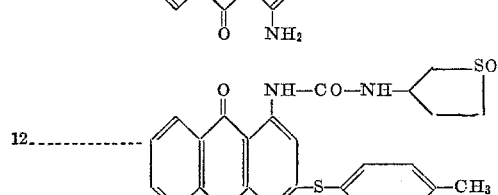 |
| 13 | 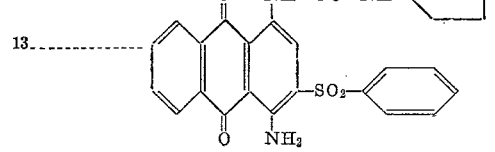 |

| Example | Dyestuff |
|---|---|
| 14 | 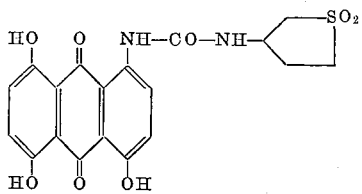 |
| 15 | 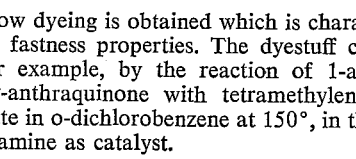 |
| 16 | 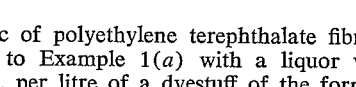 |
| 17 | 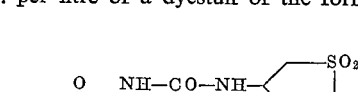 |

Example 18

A fabric of polyethylene terephthalate fibres is dyed according to Example 1(a) with a liquor which contains, per litre, 20 g. of the dyestuff of the formula:

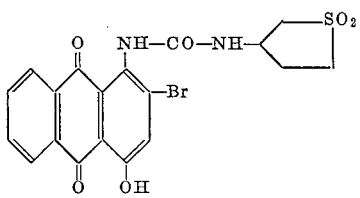

and a clear red dyeing is obtained which exhibits very good fastness properties. If cellulose triacetate fibres are used, instead of polyethylene terephthalate fibres, a clear red dyeing with excellent fastness properties is also obtained. The dyestuff can be prepared, for example, by the reaction of 1-amino-2-bromo-4-hydroxy-anthraquinone with tetramethylene-sulphone-3-isocyanate in o-dichlorobenzene at 150°, in the presence of triethylamine as catalyst. If, instead of this dyestuff, a dyestuff of the formula:

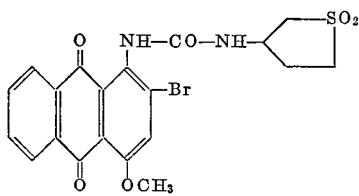

is used, an orange finish is obtained.

EXAMPLE 19

A fabric of polyethylene terephthalate fibres is dyed according to Example 1(a), with a liquor which contains, per litre, 20 g. of a dyestuff of the formula:

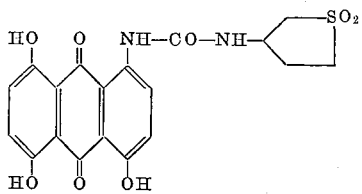

A red-yellow dyeing is obtained which is characterised by very good fastness properties. The dyestuff can be produced, for example, by the reaction of 1-amino-4,5,8-trihydroxy-anthraquinone with tetramethylene-sulphone-3-isocyanate in o-dichlorobenzene at 150°, in the presence of triethylamine as catalyst.

EXAMPLE 20

A fabric of polyethylene terephthalate fibres is dyed according to Example 1(a) with a liquor which contains 20 g. per litre of a dyestuff of the formula:

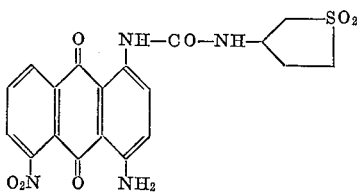

A full reddish-blue dyeing with a high dyestuff yield and excellent fastness to light, thermofixing dan washing is obtained. If dabrics of cellulose triacetate fibres are used, instead of fabrics of polyethylene terephthalate fibres, then a full reddish-blue dyeing with outstanding fastness properties is also obtained. If, instead of the above dyestuff, a dyestuff of the formula:

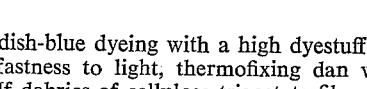

is used, then fast violet dyeings are obtained on polyethylene terephthalate and cellulose triacetate fibres.

EXAMPLE 21

A fabric of polyethylene terephthalate fibres is dyed according to Example 1(a) with a liquor containing 20 g. per litre of the dyestuff of the formula:

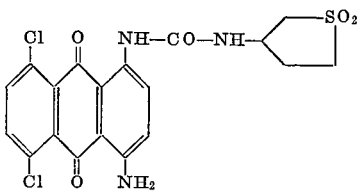

and an intense reddish-blue dyeing of very good fastness to light, washing and thermofixing is obtained. If a dyestuff of the formula:

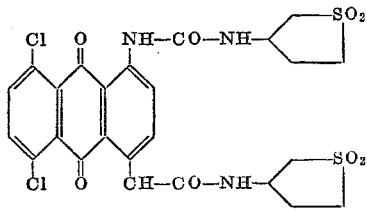

is used, instead of the above dyestuff, fast violet shades are obtained on fabrics of polyethylene terephthalate or cellulose triacetate fibres.

EXAMPLE 22

A fabric of polyethylene terephthalate fibres is dyed according to Example 1(a) with a liquor which contains 20 g. per litre of a dyestuff of the formula:

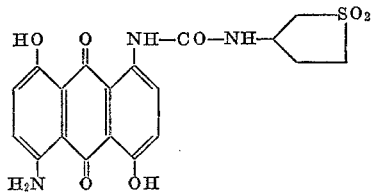

and a brilliant reddish-blue dyeing is obtained which exhibits, besides a high dyestuff yield and very good texture, excellent fastness to light, washing and thermofixing. If, instead of fabrics of polyethylene terephthalate fibres, fabrics of cellulose triacetate fibres are used, then a brilliant reddish-blue dyeing with outstanding fastness properties is also obtained. The dyestuff can be produced, for example, by the reaction of 1,5-diamino-4,8-dihydroxy-anthraquinone with tetramethylene-sulphone-3-isocyanate in nitrobenzene at 150–180°, in the presence of triethylamine as catalyst. If, instead of the above dyestuff, a dyestuff of the formula:

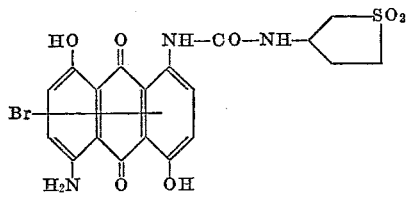

which is obtained by bromination of the above dyestuff until an average bromine content of 1 bromine per anthraquinone is obtained is used, then brilliant reddish-blue dyeings with excellent fastness properties are also obtained on polyethylene terephthalate and cellulose triacetate fibres.

EXAMPLE 23

A fabric of polyethylene terephthalate fibres is dyed according to Example 1(a) with a liquor which contains 20 g. per litre of a dyestuff of the formula:

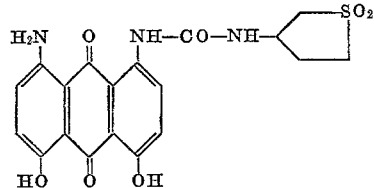

A full dark blue dyeing is obtained which is characterised, besides by a high dyestuff yield and very good texture, by excellent fastness to light, washing and thermofixing. If cellulose triacetate fibres are used instead of polyethylene terephthalate fibres, then a full dark blue dyeing with outstanding fastness properties is also obtained. The dyestuff can be prepared, for example, by the reaction of 1,8-diamino-4,5-dihydroxy-anthraquinone with tetramethylenesulphone-3-isocyanate in o-dichlorobenzene at 150°, in the presence of triethylamine as catalyst. If, instead of the above dyestuff, a dyestuff of the formula:

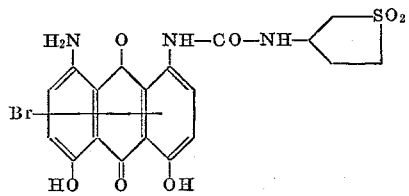

which is obtained by bromination of the above dyestuff until an average bromine content of 1 bromine per anthraquinone is obtained is used for dyeing polyethylene terephthalate or cellulose triacetate fibres, then full dark blue dyeings with very good fastness properties are also obtained.

EXAMPLE 24

When a fabric of polyethylene terephthalate is dyed according to Example 1(a) with a liquor which contains 20 g. per litre of the dyestuff of the formula:

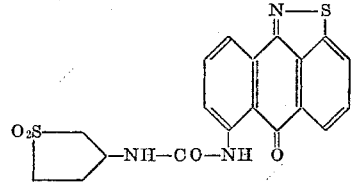

a golden-yellow dyeing is obtained which exhibits, besides a high dyestuff yield and very good texture, excellent fastness to light, washing and thermofixing. If cellulose triacetate fibres are used, instead of polyethylene terephthalate fibres, then a full golden-yellow dyeing with outstanding fastness properties is also obtained. The dyestuff can be prepared, for example, by reacting 5-amino-1,9-isothiazole-anthrone with tetramethylene - sulhpone-3-isocyanatea at 150° in o-dichlorobenzene, in the presence of triethylamine as catalyst. If, instead of the above dyestuff, a dyestuff of the formula:

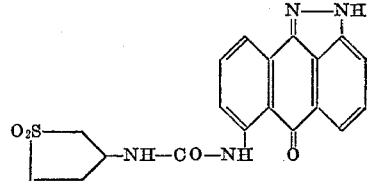

is used, clear greenish-yellow dyeings with excellent fastness properties are obtained on polyethylene terephthalate and cellulose triacetate fabrics.

Example 25

A fabric of polyethylene terephthalate fibres is dyed according to Example 1(a) with a liquor containing 20 g. per litre of the dyestuff of the formula:

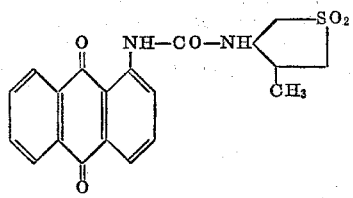

and a clear yellow dyeing is obtained which exhibits, besides a high dyestuff yield and very good texture, excellent fastness to light, washing and thermofixing. If fabrics of cellulose triacetate fibres area used, instead of fabrics of polyethylene terephthalate fibres, then clear yellow dyeings with outstanding fastness properties are also obtained. When polyethylene terephthalate or cellulose triacetate fibres are printed according to Example 1(b) with the above dyestuff, clear yellow prints with very good fastness properties are obtained. The dyestuff can be produced, for example, by reacting 1-amino-anthraquinone with 4-methyl-tetramethylene-sulphone-3-isocyanate in o-dichloro-benzene at 150–160°, in the presence of triethylamine as catalyst.

In the following table dyestuffs are listed which are obtained in the manner described in Example 25, as well as their colour shades on polyethylene terephthalate or cellulose triacetate fibres. The dyestuffs are dyed or printed according to Example 1(a) or 1(b).

| Ex. | Dyestuff | Shade |
|---|---|---|
| 26 | 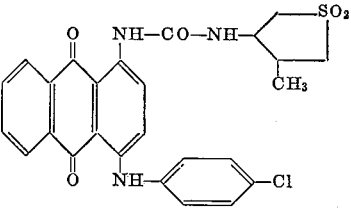 | Yellowish-red. |
| 27 | 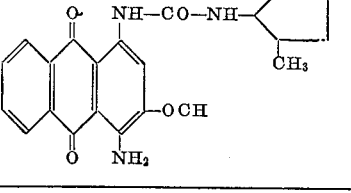 | Orange. |
| 28 | 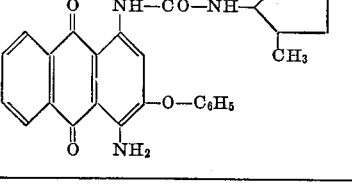 | Yellow. |
| 29 | 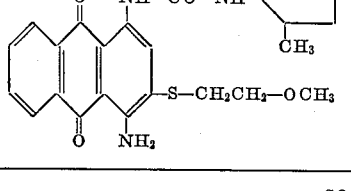 | Yellow. |
| 30 | 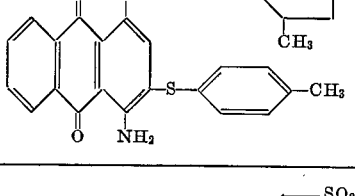 | Bluish-red. |
| 31 | 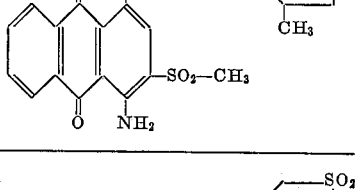 | Bluish-red. |
| 32g | 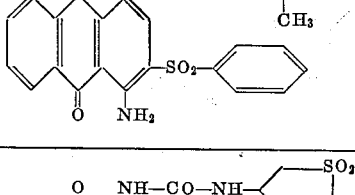 | Dark blue. |
| 33 | 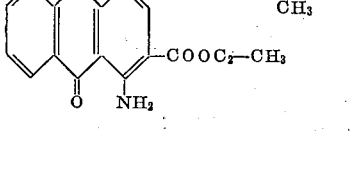 | Bluish-red. |
| 34 | 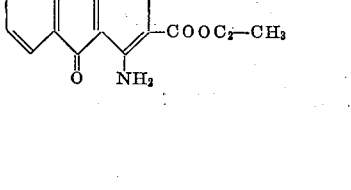 | Bluish-red. |
| 35 | 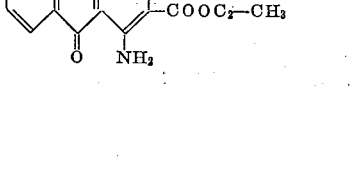 | Bluish-red. |
| 36 | 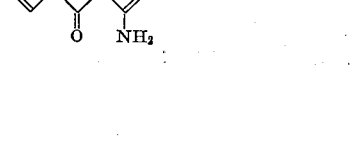 | Bluish-red. |
| 37 | 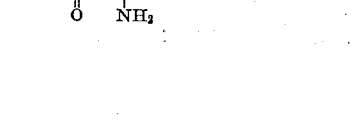 | Bluish-red. |
| 38 |  | Bluish-red. |
| 39 |  | Bluish-red. |

| Ex. | Dyestuff | Shade |
|---|---|---|
| 40 | 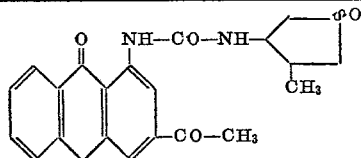 | |
| 41 | 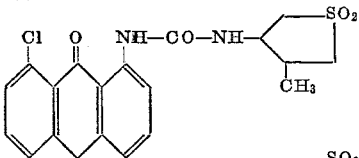 | Bluish-red. |
| 42 | 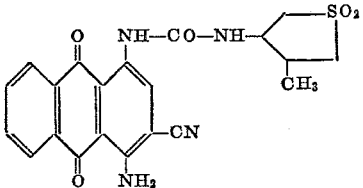 | Bluish-red. |
| 43 | 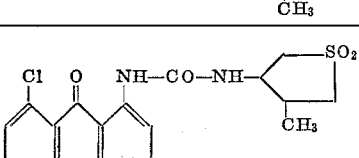 | Red. |
| 44g | 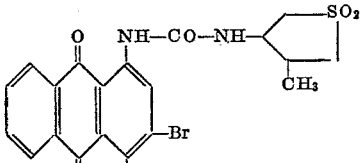 | Orange. |
| 45 |  | Reddish-blue. |
| 46 | 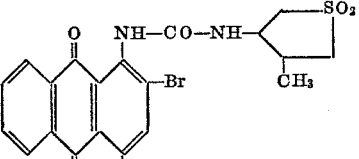 | Violet. |
| 47 | 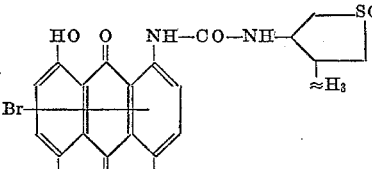 | Reddish-blue. |
| 48 | 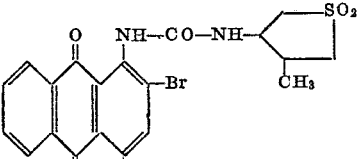 | Violet. |
| 49 | 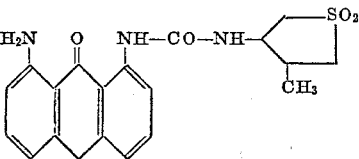 | Reddish-blue. |
| 50 | 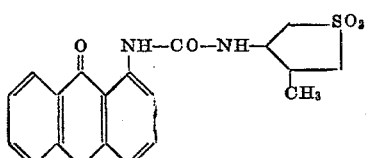 | Reddish-blue. |
| 51 | 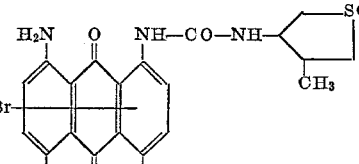 | Reddish-blue. |
| 52 | 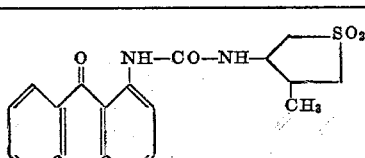 | Reddish-blue. |
| 53 | 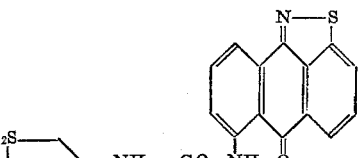 | Golden-yellow. |
| 54 | 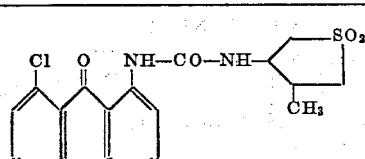 | Greenish-yellow- |
Example 55
A fabric of polyethylene terephthalate fibres is dyed according to Example 1(a) with a liquor which contains 20 g. per litre of the dyestuff of the formula.

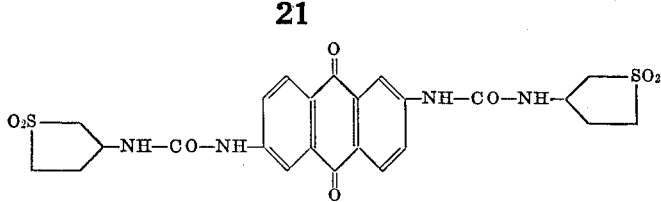
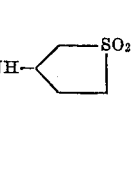

A clear yellow dyeing with very good fastness properties is obtained. If fabrics of cellulose triacetate fibres are employed, instead of polyethylene terephthalate fibres, then a clear yellow dyeing with excellent fastness properties is also obtained.

What we claims is:

1. Dyestuff having the general formula:

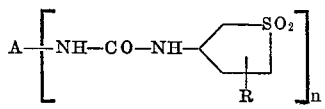

where A is an unsubstituted anthraquinone radical or a substituted anthraquinone radical in which the substituents are selected from the group consisting of fluorine; chlorine; bromine; hydroxy; nitro; cyano; amino; substituted amino in which the substituent is alkyl of 1 to 3 carbon atoms, —$CH_2$—$CH_2$—$OCH_3$, —$CH_2$—$_2CH$—CN, phenyl, or substituted phenyl in which the substituents are chlorine, bromine, methyl, methoxy,

—$OCH_2$—$CH_2$—$OCH_3$ cyano or $CF_3$, $SO_2R'$ wherein R' is alkyl of up to 6 carbon atoms, —$CH_2CH_2$—$OCH_3$ or —$CH_2CH_2$—CN;

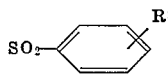

wherein $R_2$ is H, chlorine, bromine, methyl, methoxy or —$CH_2CH_2$—$OCH_3$; $OR^3$ wherein $R^3$ is alkyl of up to 6 carbon atoms, —$CH_2CH_2$—$OCH_3$, phenyl, methyl phenyl, methoxy phenyl, chlorophenyl or bromophenyl; —$SR^4$ wherein $R^4$ is H, alkyl of up to 6 carbon atoms, methoxy, chlorine, bromine, phenyl, chlorophenyl, bromophenyl, methylphenyl, methoxyphenyl or phenyl —$CH_2CH_2OCH_3$; $COR^5$ wherein $R^5$ is methyl, ethyl, or propyl; $COOR^6$ wherein $R^6$ is alkyl of 1 to 4 carbon atoms; and —NH—$COR^7$ wherein $R^7$ is alkyl of from 1 to 4 carbon atoms, —$CH_2O$—$C_2H_5$, cyanomethyl, chloromethyl, phenyl, methylphenyl, methoxyphenyl, ethoxyphenyl, fluorophenyl or chlorophenyl; R is hydrogen or methyl and n is 1 or 2.

2. Dyestuff of the formula:

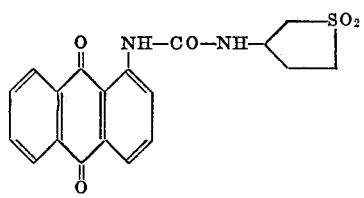

3. Dyestuff of the formula:

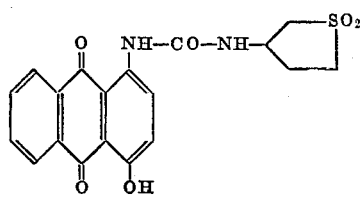

4. Dyestuff of the formula:

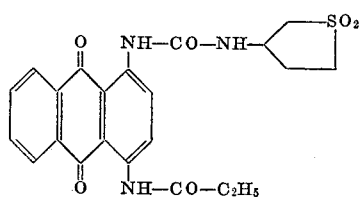

5. Dyestuff of the formula:

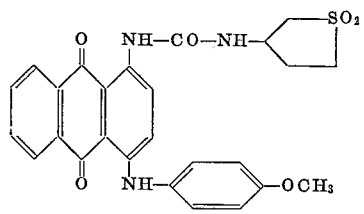

6. Dyestuff of the formula:

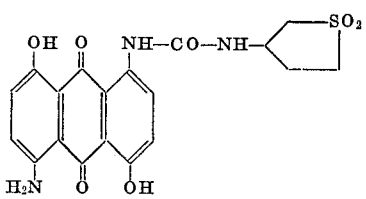

7. Dyestuff of the formula:

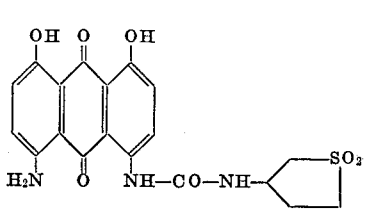

References Cited

UNITED STATES PATENTS

| | | | |
|---|---|---|---|
| 3,086,977 | 4/1963 | Turetzky | 260—272 |
| 3,249,626 | 5/1966 | Neef et al. | 260—329.2 |
| 3,412,100 | 11/1968 | Wallace et al. | 260—329.2 |

HENRY R. JILES, Primary Examainer

C. M. SHURKO, Assistant Examiner

U.S. Cl. X.R.

260—256.4, 256.5, 261, 303, 312, 332.1, 370, 371, 372, 373, 374, 375, 376, 377, 378, 380, 381; 8—39, 40

UNITED STATES PATENT OFFICE
CERTIFICATE OF CORRECTION

Patent No. 3,489,773            Dated Jan. 13, 1970

Inventor(s) Rutger Neeff et al.

It is certified that error appears in the above-identified patent and that said Letters Patent are hereby corrected as shown below:

| Column | Line | Error | | |
|---|---|---|---|---|
| 1 | 68, in the formula | " 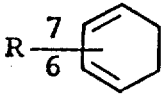 " | should read | --- 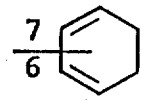 ---. |
| 6 | 3rd formula | " 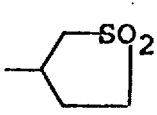 " | should read | --- 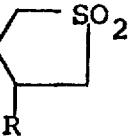 ---. |

UNITED STATES PATENT OFFICE
CERTIFICATE OF CORRECTION

Patent No. 3,489,773           Dated Jan. 13, 1970

Inventor(s) Rutger Neeff et al.          PAGE - 2

It is certified that error appears in the above-identified patent and that said Letters Patent are hereby corrected as shown below:

| Column | Line | Error |
|---|---|---|
| 6 | 5th formula | " 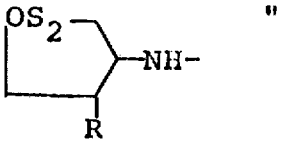 " should read --- 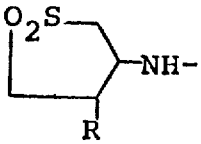 ---. |
| 7 | 1st formula | " 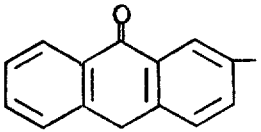 " should read --- 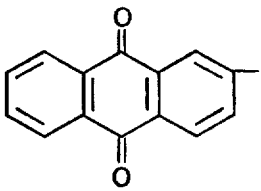 ---. |

UNITED STATES PATENT OFFICE
CERTIFICATE OF CORRECTION

Patent No. 3,489,773        Dated Jan. 13, 1970

Inventor(s) Rutger Neeff et al.     PAGE - 3

It is certified that error appears in the above-identified patent and that said Letters Patent are hereby corrected as shown below:

| Column | Line | Error |
|---|---|---|
| 7 | 2nd formula | " 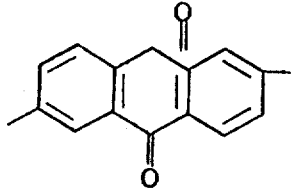 " | should read

--- 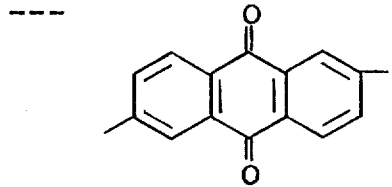 ---.

| | | |
|---|---|---|
| 9 | 48 | "th" should read --- the ---. |
| 13 | Example 16 | " 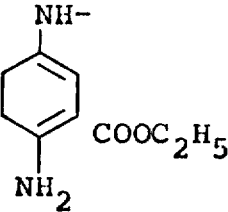 " |

UNITED STATES PATENT OFFICE
CERTIFICATE OF CORRECTION

Patent No. 3,489,773                     Dated Jan. 13, 1970

Inventor(s)  Rutger Neeff et al.     PAGE - 4

It is certified that error appears in the above-identified patent and that said Letters Patent are hereby corrected as shown below:

| Column | Line | Error |
|---|---|---|
| 13 (Continued) | | should read --- [structure: benzene ring with NH–, NH$_2$, and –COOC$_2$H$_5$ substituents] ---. |
| 13 | Example 17 | "SO4$_2$" should read --- SO$_2$ ---. |
| 14 | 41 | "dan" should read --- and ---. |
| 14 | 42 | "dabrics" should read --- fabrics ---. |
| 16 | 42 | "isocyanatea" should read --- isocyanate ---. |
| 16 | 72 | "area" should read --- are ---. |

UNITED STATES PATENT OFFICE
CERTIFICATE OF CORRECTION

Patent No. 3,489,773   Dated Jan. 13, 1970

Inventor(s) Rutger Neeff et al.   PAGE - 5

It is certified that error appears in the above-identified patent and that said Letters Patent are hereby corrected as shown below:

| Column | Line | Error |
|---|---|---|
| 17 | Example 30 | "$nO_2$" should read --- $SO_2$ ---. |
| 18 | Example 32 | "32g" should read --- 32 ---. |
| 19 | Example 40 | "$SO_2$" should read --- $SO_2$ ---. Add "Bluish-red" under Shade Column. |
| 19 | Example 44 | "44g" should read --- 44 ---. |
| 20 | Example 49 | "  " should read --- 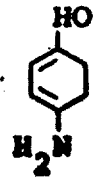 ---. |

UNITED STATES PATENT OFFICE
CERTIFICATE OF CORRECTION

Patent No. 3,489,773     Dated Jan. 13, 1970

Inventor(s) Rutger Neeff et al.     PAGE - 6

It is certified that error appears in the above-identified patent and that said Letters Patent are hereby corrected as shown below:

| Column | Line | Error |
|---|---|---|
| 20 | Example 50 | |
| 21 | 27 | "$-CH_2-_2CH-CN,$" should read --- $-CH_2-CH_2-CN,$ ---. |

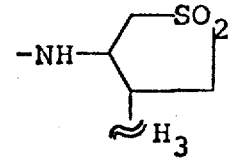

NOV. 3, 1970

(SEAL)
Attest:

Edward M. Fletcher, Jr.
Attesting Officer

WILLIAM E. SCHUYLER, JR.
Commissioner of Patents